US012650617B2

(12) United States Patent
Michelon

(10) Patent No.: US 12,650,617 B2
(45) Date of Patent: Jun. 9, 2026

(54) DEVICE FOR DETECTING THE CONDITION OF EYEGLASSES BEING WORN

(71) Applicant: LUXOTTICA S.R.L., Agordo (IT)

(72) Inventor: Dino Michelon, Ponte Nelle Alpi (IT)

(73) Assignee: LUXOTTICA S.R.L., Agordo (IT)

( * ) Notice: Subject to any disclaimer, the term of this patent is extended or adjusted under 35 U.S.C. 154(b) by 294 days.

(21) Appl. No.: 18/559,953

(22) PCT Filed: Apr. 27, 2022

(86) PCT No.: PCT/EP2022/061198
§ 371 (c)(1),
(2) Date: Nov. 9, 2023

(87) PCT Pub. No.: WO2022/238121
PCT Pub. Date: Nov. 17, 2022

(65) Prior Publication Data
US 2025/0035964 A1      Jan. 30, 2025

(30) Foreign Application Priority Data
May 11, 2021    (IT) ......................... 102021000011999

(51) Int. Cl.
G02C 5/14          (2006.01)
G02C 11/00         (2006.01)
(52) U.S. Cl.
CPC ................ G02C 11/10 (2013.01); G02C 5/14 (2013.01)
(58) Field of Classification Search
CPC ............ G02C 11/10; G02C 5/14; G06F 1/163

USPC .......................................................... 351/111
See application file for complete search history.

(56) References Cited

U.S. PATENT DOCUMENTS

| | | |
|---|---|---|
| 2018/0049697 A1 | 2/2018 | Rousseau et al. |
| 2018/0081201 A1 | 3/2018 | Lore et al. |
| 2018/0348547 A1* | 12/2018 | Rousseau ........... G02B 27/0172 |
| 2020/0064659 A1* | 2/2020 | Boularot ................... G01J 1/42 |
| 2020/0129124 A1* | 4/2020 | Harvey ................. G02C 11/10 |
| 2020/0348540 A1* | 11/2020 | Nepola ................. G02C 11/10 |
| 2021/0011547 A1* | 1/2021 | Katz .................... G06V 40/171 |
| 2021/0386366 A1* | 12/2021 | Zakharov ................. A61B 3/00 |

FOREIGN PATENT DOCUMENTS

| | | |
|---|---|---|
| CN | 112596414 A | 4/2021 |
| EP | 3299871 A1 | 3/2018 |
| EP | 3649920 A1 | 5/2020 |

(Continued)

OTHER PUBLICATIONS

International Search Report for International Application No. PCT/EP2022/061198, dated Aug. 3, 2022, 3 pages.

(Continued)

*Primary Examiner* — William R Alexander
(74) *Attorney, Agent, or Firm* — CANTOR COLBURN LLP

(57) ABSTRACT

A device for detecting the condition of eyeglasses being worn, which includes a sensor adapted to be accommodated inside a temple of a pair of eyeglasses and includes at least one first active area and at least one second active area. The first active area is adapted to be directed toward the head of the user, and the second active area is adapted to be directed outward.

9 Claims, 1 Drawing Sheet

(56)  References Cited

FOREIGN PATENT DOCUMENTS

| JP | H05291924 | A | 11/1993 |
| JP | 2009080241 | A | 4/2009 |
| JP | 2009244603 | A | 10/2009 |
| JP | 2009247361 | A | 10/2009 |
| JP | 2014233070 | A | 12/2014 |
| WO | 2013050735 | A1 | 4/2013 |
| WO | 2016194772 | A1 | 12/2016 |
| WO | 2018017997 | A1 | 1/2018 |

OTHER PUBLICATIONS

Italian Search Report for Italian Application No. 102021000011999, dated Jan. 20, 2022, 8 pages.
Written Opinion for International Application No. PCT/EP2022/061198, dated Aug. 3, 2022, 6 pages.
Japanese Office Action for Application No. 2023-570033, dated Nov. 13, 2025, 8 pages with translation.
European Office Action for Application No. 22 725 868.8, dated Dec. 23, 2025, 7 pages.

* cited by examiner

DEVICE FOR DETECTING THE CONDITION OF EYEGLASSES BEING WORN

CROSS-REFERENCE TO RELATED APPLICATIONS

This application is a 35 U.S.C. § 371 National Stage patent application of PCT/EP2022/061198, filed on 27 Apr. 2022, which claims the benefit of Italian patent application 102021000011999, filed on 11 May 2021, the disclosures of which are incorporated herein by reference in their entirety.

TECHNICAL FIELD

The present disclosure relates to a device for detecting the condition of eyeglasses being worn. More specifically, the disclosure relates to a device that is adapted to detect whether or not the user has worn a pair of eyeglasses of electronic type.

BACKGROUND

As is known, "electronic eyeglasses" or, more commonly, "smart glasses", have a plurality of functions available to the user which must be activated only when the eyeglasses are worn by the user. This in order to reduce battery consumption and so extend the usage duration of the electronic functions for the user.

Currently, solutions exist that make it possible to detect whether or not a pair of eyeglasses is being worn. Such solutions make use of touch-sensitive areas, or infrared sensors, temperature sensors and the like, which are capable of providing an indication of whether or not the pair of eyeglasses is being worn by the user.

However, such solutions tend to report many false positives and therefore they are not sufficiently reliable to provide a clear indication of eyeglasses being worn or otherwise.

Obviously, if the number of false positives is excessively high, the device is no longer reliable, and therefore it is no longer useful in use in the field of eyeglasses.

SUMMARY

The aim of the present disclosure is to provide a device for detecting eyeglasses being worn, which is capable of reducing false positives to the minimum.

Within this aim, the present disclosure provides a device for detecting eyeglasses being worn, which makes it possible to discriminate between eyeglasses correctly worn and eyeglasses, for example, held in the hand or folded in the collar of a T-shirt.

the present disclosure also provides a device for detecting eyeglasses being worn, which makes it possible to disregard as far as possible the shape and size of the head of the user who is wearing the eyeglasses.

the present disclosure further provides a device for detecting eyeglasses being worn, which can be used in any type of electronic eyeglasses.

the present disclosure also provides a device for detecting eyeglasses being worn, which can be incorporated in a pair of electronic eyeglasses.

The present disclosure provides a device for detecting eyeglasses being worn, that is highly reliable, easily and practically implemented and of low cost.

This aim and these and other advantages which will become better apparent hereinafter are achieved by providing a device for detecting the condition of eyeglasses being worn, characterized in that it comprises a sensor adapted to be accommodated inside the temple of a pair of eyeglasses, said sensor comprising at least one first active area and at least one second active area, said first active area being adapted to be directed toward the head of the user, said second active area being adapted to be directed outward.

BRIEF DESCRIPTION OF THE DRAWINGS

Further characteristics and advantages of the disclosure will become better apparent from the description of a preferred, but not exclusive, embodiment of the device according to the present disclosure, which is illustrated by way of non-limiting example in the accompanying drawings wherein.

DETAILED DESCRIPTION OF THE DRAWINGS

Figure 1:
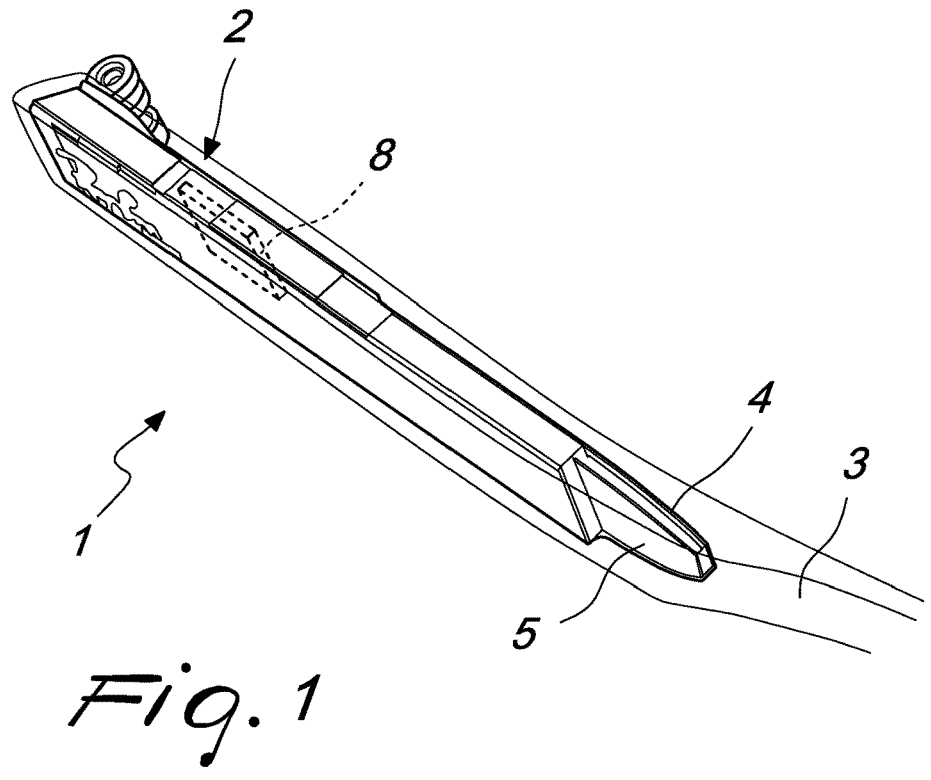
FIG. 1 is a perspective view of an eyeglass temple with the device according to the present disclosure inserted.

With reference to the figures, in which identical reference numerals refer to identical elements, the detecting device according to the present disclosure is generally designated by the reference numeral 1.

The device comprises a sensor 2 configured to be accommodated inside a temple 3 of a pair of eyeglasses, the sensor 2 comprising at least one active area 4 intended to be directed toward the inside of the temple 3, i.e. toward the head of the user who is wearing the eyeglasses, and at least one active area 5 intended to be directed outward from the temple 3.

The two active areas 4 and 5 supply two different values: the final value, which is detected and used as an indicator of eyeglasses being worn or not being worn, is constituted by a difference between the value detected by the internal active area 4 and the value detected by the external active area 5.

The device according to the disclosure is capable of calibrating itself to the specific head of the user, so as to avoid false positives or in any case incorrect signals.

The device is capable of calculating a base value and a high value, in addition to a threshold value. The base value is defined as the value detected by the device when the eyeglasses are not being worn. Generally the period considered is 3 seconds, but this can vary according to requirements.

By contrast, the high value is calculated as a value during a period of the eyeglasses being worn. In this case too, the time period can be 3 seconds or more.

The threshold value is at this point calculated as the difference between the high value and the base value.

The device comprises, therefore, processing and calculation means 8, integrated for example in the temple 3 or in the front of the eyeglasses, which are adapted to calculate the base value during a period of eyeglasses not being worn, and a value (the high value) during a period of eyeglasses being worn.

Figure 2:
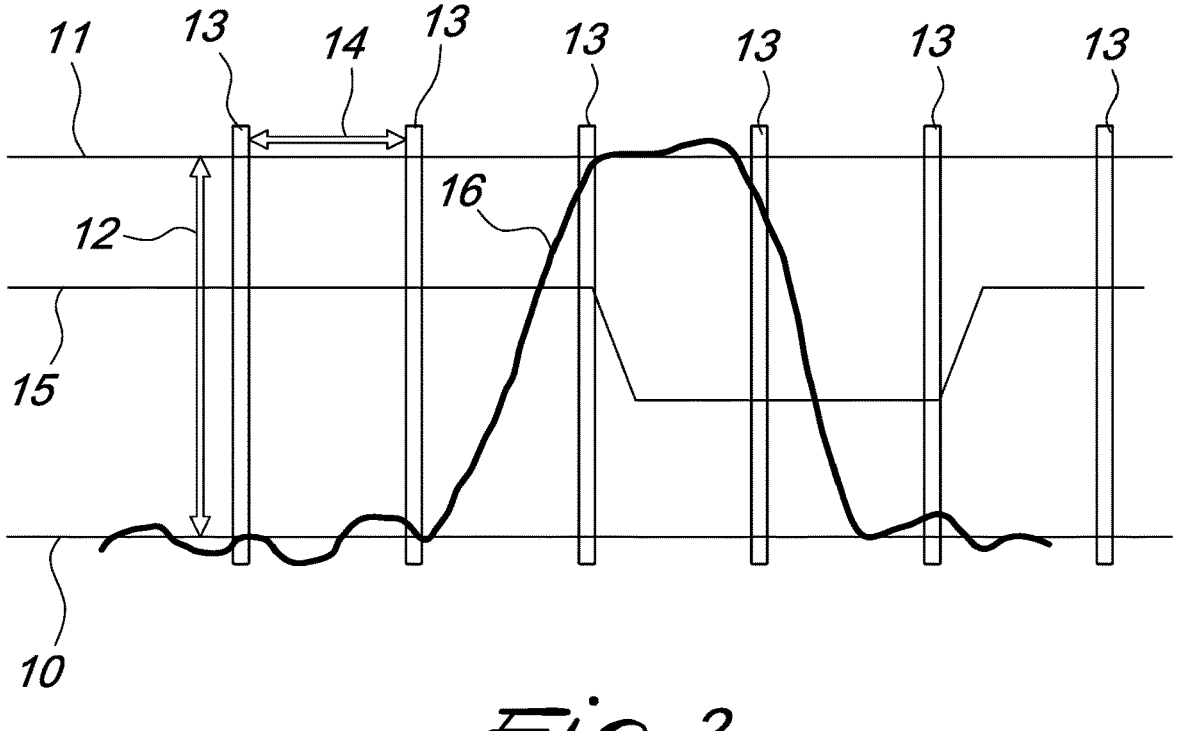
FIG. 2 is a graph of the values detected by the device according to the disclosure.

The graph of FIG. 2 illustrates what is described above. The base value is indicated by the reference numeral 10, the high value with 11 and the threshold value is indicated by the reference numeral 12.

The reference numeral 13 indicates the number of samples (average factor) taken and the distance between the various reference numerals 13 indicates the sampling frequency 14 used.

The threshold value 12 is weighted with a hysteresis value; the default hysteresis value can be, for example, 0.33. In this case, for example, there would be a value of 1-hysteresis, i.e. 1−0.33=0.66 when the eyeglasses are not being worn and a hysteresis value=0.33 when the eyeglasses are being worn.

The hysteresis of the threshold (i.e. the threshold value weighted with the hysteresis value) is designated by the reference numeral 15 in FIG. 2.

The condition of eyeglasses being worn occurs when the measured value, indicated in FIG. 2 by the reference numeral 16, is above the threshold value weighted with hysteresis 15.

The condition of eyeglasses being worn is determined after a consecutive number of occurrences of the eyeglasses being worn, i.e., after a number of consecutive measurements, for example five, in which the value measured by the active areas is above the weighted threshold value.

Each measurement is the average of a number of individual measurements spaced apart by a short delay, for example, approximately 1 millisecond.

The measuring of the data is periodically repeated, for example, every 150 milliseconds.

The process includes a first step in which a base value 10 is calculated during a period of eyeglasses not being worn. Subsequently a value 11 is calculated during a period of eyeglasses being worn.

Then a threshold value 12 is calculated, which is given by the difference between the base value 10 and the value 11 calculated during the period of eyeglasses being worn.

The threshold value is then weighted with a hysteresis value, in order to obtain a weighted threshold value 15.

The foregoing constitutes a step of calibration that makes it possible to obtain a weighted threshold value 15 which will then be used for comparison with a measured value, in order to determine whether or not the pair of eyeglasses is being worn by the user.

The measurement process adapted to detect whether or not the pair of eyeglasses is being worn, described above, makes it possible to calibrate the system to the specific head of the user, by first carrying out a form of self-calibration, and it is unaffected by external disturbances, such as, for example, the condition of eyeglasses being placed on a table, eyeglasses folded in the collar of a T-shirt or straddling a necklace or, also, eyeglasses held in the hand, and the like.

In practice it has been found that the device according to the disclosure and the corresponding method achieve the intended aim and advantages, in that they make it possible to detect the status of eyeglasses being worn, while minimizing the number of false positives, by self-calibrating the measurement to the specific head of the user, therefore remaining unaffected by external or internal alterations such as described above.

The device and the method, thus conceived, are susceptible of numerous modifications and variations, all of which are within the scope of the appended claims.

Moreover, all the details may be substituted by other, technically equivalent elements.

In practice, the materials used, as well as the contingent shapes and dimensions, may be any according to the requirements and to the state of the art.

The invention claimed is:

1. A device for detecting the condition of eyeglasses being worn, the device comprising: a sensor adapted to be accommodated inside a temple of a pair of eyeglasses, said sensor comprising at least one first active area and at least one second active area, said first active area being adapted to be directed toward the head of the user, said second active area being adapted to be directed outward, wherein a measured value is given by a difference between a value measured by said first active area and a value measured by said second active area.

2. The device according to claim 1, further comprising processing and calculation means adapted to calculate a base value during a period of eyeglasses not being worn, and a value during a period of eyeglasses being worn.

3. The device according to claim 2, wherein said processing and calculation means are adapted to calculate a threshold value defined as a difference between said value calculated during the period of eyeglasses being worn and said base value for the period of eyeglasses not being worn.

4. The device according to claim 3, wherein said threshold value is weighted with a hysteresis value.

5. A method for detecting a condition of eyeglasses being worn, the method including the following steps:

calculating a base value during a period of eyeglasses not being worn, calculating a value during a period of eyeglasses being worn, calculating a threshold value defined as a difference between said base value and said value calculated during the period of eyeglasses being worn, weighting said threshold value with a hysteresis value, in order to obtain a weighted threshold value, and measuring a value using at least one first active area and at least one second active area of a device for detecting a condition of eyeglasses being worn and comparing whether said measured value is higher than said weighted threshold value in order to determine whether the eyeglasses are being worn.

6. The method according to claim 5, wherein said measured value is given by the difference between measured values of said first and second active areas of said device for detecting the condition of eyeglasses being worn.

7. The method according to claim 5, wherein the condition of eyeglasses being worn is determined after a consecutive number of measurements in which said measured value is higher than said weighted threshold value.

8. A device for detecting the condition of eyeglasses being worn, the device comprising: a sensor adapted to be accommodated inside a temple of a pair of eyeglasses, said sensor comprising at least one first active area and at least one second active area, said first active area being adapted to be directed toward the head of the user, said second active area being adapted to be directed outward, further comprising processing and calculation means adapted to calculate a base value during a period of eyeglasses not being worn, and a value during a period of eyeglasses being worn, wherein said processing and calculation means are adapted to calculate a threshold value defined as a difference between said value calculated during the period of eyeglasses being worn and said base value for the period of eyeglasses not being worn, and wherein said threshold value is weighted with a hysteresis value.

9. The device according to claim 8, wherein a measured value is given by a difference between a value measured by said first active area and a value measured by said second active area.

* * * * *